United States Patent [19]

Stavis

[11] 4,125,836
[45] Nov. 14, 1978

[54] ELECTRICALLY SCANNED ANTENNA SYSTEM AND MODULATOR FOR OMNIDIRECTIONAL RADIO RANGE

[75] Inventor: Gus Stavis, Wayne, N.J.
[73] Assignee: The Singer Company, Little Falls, N.J.
[21] Appl. No.: 872,331
[22] Filed: Jan. 25, 1978
[51] Int. Cl.² .............................................. G01S 1/08
[52] U.S. Cl. .................................... 343/102; 343/107
[58] Field of Search ............. 343/100 SA, 102, 106 R, 343/854, 107

[56] References Cited

U.S. PATENT DOCUMENTS

| | | | |
|---|---|---|---|
| 3,133,282 | 5/1964 | Rosen | 343/106 R |
| 3,725,929 | 3/1973 | Spanos | 343/100 SA |
| 3,787,859 | 1/1974 | Howard | 343/100 SA |
| 3,827,050 | 7/1974 | Glazer et al. | 343/106 R |

Primary Examiner—Maynard R. Wilbur
Assistant Examiner—Lawrence Goodwin
Attorney, Agent, or Firm—Thomas W. Kennedy

[57] ABSTRACT

An antenna system in which the antennas are not mechanically rotated generates an amplitude-modulated signal of equal intensity in all horizontal directions with the phase of the amplitude modulation varying directly with bearing or azimuth to the antenna system. The antenna system uses a central antenna which radiates a carrier signal and a plurality of sideband antennas, 4 in number, which radiate upper and lower sideband signals. The phase of the upper sideband signal is advanced in increments of $\pi/2$ radians processing around the sideband antennas in a chosen direction, while the phase of the lower sideband signal is delayed in increments of $\pi/2$ radians proceeding around the sideband antennas in the chosen direction.

12 Claims, 4 Drawing Figures

ELECTRICALLY SCANNED ANTENNA SYSTEM AND MODULATOR FOR OMNIDIRECTIONAL RADIO RANGE

BACKGROUND OF THE INVENTION

This invention relates to antennas in general and more particularly to an improved antenna system for generating bearing information for use by aircraft.

Typically, bearing information in an omnidirectional radio range transmitting station is transmitted by using a rotating antenna. Mechanical rotation of the antenna can entail high equipment and maintenance costs for the system.

A low cost antenna system which does not use mechanically rotating antennas would enable bearing information to be transmitted from many of the distant measuring equipment (DME) ground stations used in aircraft navigation. In order to be employed at a DME ground station, the system transmitting the bearing information would have to conserve transmitter power to retain the service range of the DME ground station.

SUMMARY OF THE INVENTION

It is an object of the present invention to provide a system which will permit a bearing or omni range feature to be added to an existing DME ground station.

It is also an object of the present invention to transmit bearing information in a manner which will conserve transmitter power, i.e., have minimum insertion loss, to retain the service range of the DME. Furthermore, it is an object of the invention to accomplish the transmission of bearing information without requiring mechanical rotation of the antenna or its parts.

The present invention achieves the foregoing objectives by generating an amplitude modulated signal of equal intensity in all horizontal directions with the phase of the amplitude modulation varying directly with bearing or azimuth to the antenna system. The receiving aircraft can determine the bearing to the antenna system by comparing the phase of the amplitude modulated signal to the phase of a reference pulse or burst of pulses transmitted omnidirectionally as a direct modulation of the transmitted signal.

The antenna system of the present invention uses a central carrier antenna to transmit a carrier signal. A plurality of sideband antennas, 4 in number, are positioned equidistant from the carrier antenna and with equal angular displacement between adjacent sideband antennas. The sideband antennas transmit an upper sideband (USB) signal and a lower sideband (LSB) signal having frequencies differing from the carrier signal by an amount equal to the frequency of an offset signal. Proceeding around the sideband antennas in a chosen direction, the USB signal transmitted by each sideband antenna is advanced in phase $\pi/2$ radians with respect to the USB signal transmitted by the preceding sideband antenna and the LSB signal transmitted by each sideband antenna is delayed in phase $\pi/2$ radians with respect to the LSB signal transmitted by the preceding antenna. The far field pattern of the signals transmitted by the antenna system is an amplitude-modulated signal having a phase directly related to bearing from the antenna system.

DETAILED DESCRIPTION OF THE INVENTION

Figure 1:
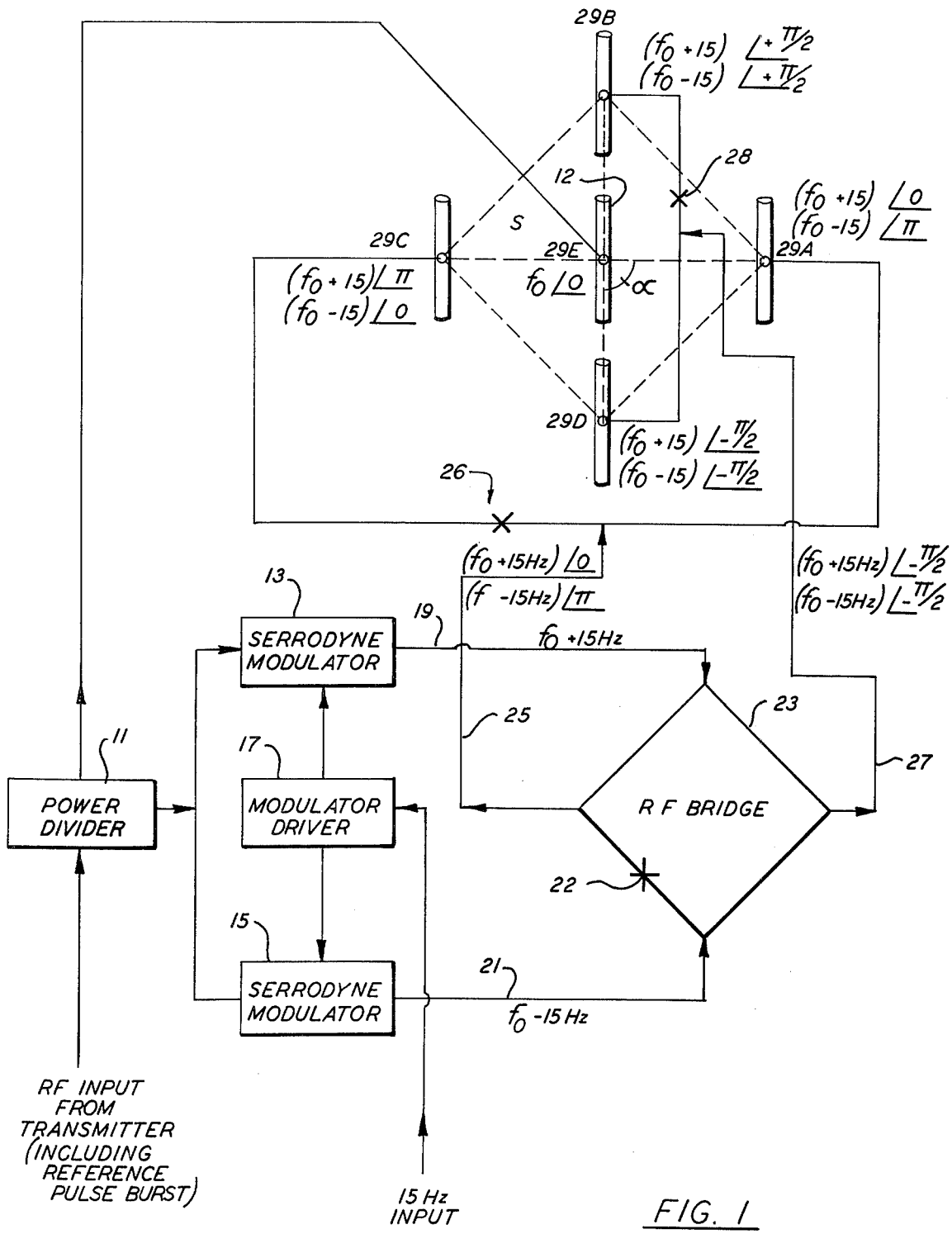
FIG. 1 is a block diagram of a preferred embodiment of the antenna system of the present invention.

As illustrated in FIG. 1, a radio frequency carrier signal from a transmitter, which is directly modulated by a reference pulse burst in the same manner as is now common in Tacan systems, is coupled into a power divider 11 where a portion of the energy is coupled out to a central carrier antenna 12. The remaining power is coupled into two serrodyne modulators 13 and 15. The serrodyne modulators 13 and 15 receive modulating inputs from a modulator driver 17 which is fed with an offset signal having a frequency of 15 Hz.

Serrodyne modulators 13 and 15 are used to generate upper sideband (USB) and lower sideband (LSB) signals having frequencies displaced from the carrier frequency by an amount equal to the frequency of the offset signal. A serrodyne modulator (also known as a single sideband generator) generates a new frequency from a given input frequency by introducing a linear phase shift (with time) from 0° to 360°, quickly resetting the phase shift to 0°, and repeating the cycle at a rate equal to the desired frequency offset. Thus, over a given time period (T), the phase shift increases linearly from 0° to 360° and then is immediately reset to 0° resulting in a sawtooth waveform if phase is plotted against time. The result of carrying out a modulation of this type is that over time period T a 360° phase shift is introduced thereby adding or subtracting exactly one complete cycle to the signal which results in a frequency exactly 1/T higher or lower than the original frequency. Thus, in the present situation, where the modulation frequency of the offset signal is 15 Hz, the carrier signal which is being modulated is phase modulated through 360° at a 15 Hz rate using a saw-tooth wave form so that the net effect is to continuously increase or decrease the phase of the carrier signal at a 360°/1/15 sec rate. Typically, serrodyne modulators may be implemented using a voltage controlled capacitor such as a varactor placed across an r.f. circuit to cause a phase shift of the output signal.

The serrodyne modulator 13 increases the carrier frequency ($f_0$) and the serrodyne modulator 15 decreases the carrier frequency such that the output on line 19 is an upper sideband (USB) signal with a frequency of $f_0 + 15$Hz, and the output on line 21 is a lower sideband (LSB) signal with a frequency of $f_0 - 15$Hz. These two outputs are placed across the diagonal of an r.f. bridge 23, which has four equal arms, one of which is an inverting arm 22.

At inverting arm 22 of r.f. bridge 23 conventional inversion means are used to shift the phase of the LSB signal by $\pi$ radians. This shifted signal is combined with the USB signal on transmission line 25. The USB and LSB signals are combined on transmission line 27 and the phase of the combined USB and LSB signals on transmission line 27 is phase delayed by $\pi/2$ radians by conventional means (e.g., altering the length of transmission line 27 vis-a-vis transmission line 25). Transmission line 25 is fed to sideband antenna 29a and, after a phase shift of $\pi$ radians is introduced by conventional means at point 26 is also fed to sideband antenna 29c. Output line 27 is fed to sideband antenna 29d and, after a phase shift of $\pi$ radians is introduced by conventional means at point 28, is also fed to sideband antenna 29b.

FIG. 1 shows that the four sideband antennas are positioned at the vertices of a square, with carrier antenna 12 located in the center of the square. Each of the sideband antennas is equidistant from the carrier antenna 12, and the angular displacement between adjacent sideband antennas (such as sideband antennas 29a and 29d) is $\pi/2$ radians.

FIG. 1 also shows that proceeding around the sideband antennas in a counterclockwise direction (i.e., from antenna 29a to antenna 29b to antenna 29c to antenna 29d), the phase of the USB signal transmitted by a sideband antenna is advanced in phase $\pi/2$ radians with respect to the phase of the USB signal transmitted by the preceding antenna, while the phase of the LSB signal transmitted by a sideband antenna is delayed in phase $\pi/2$ radians with respect to the phase of the LSB signal transmitted by the preceding antenna. For example, the phase of the USB signal transmitted by antenna 29b is advanced $\pi/2$ radians in phase while the phase of the USB signal transmitted by antenna 29a is advanced 0 radians in phase, and the phase of the LSB signal transmitted by antenna 29b is only advanced $\pi/2$ radians while the phase of the LSB signal transmitted by antenna 29a is advanced $\pi$ radians.

It is evident that a satisfactory phase modulated signal could also be generated if the USB and LSB signals fed to the sideband antennas were rearranged so that the USB signal would be advanced in phase $\pi/2$ radians proceeding in a clockwise direction while the LSB signal would be delayed $\pi/2$ radians proceeding in a clockwise direction. Thus either a clockwise or a counterclockwise direction of phase variance could be chosen to generate a phase modulated signal varying directly with bearing to the antenna system.

Figure 2:
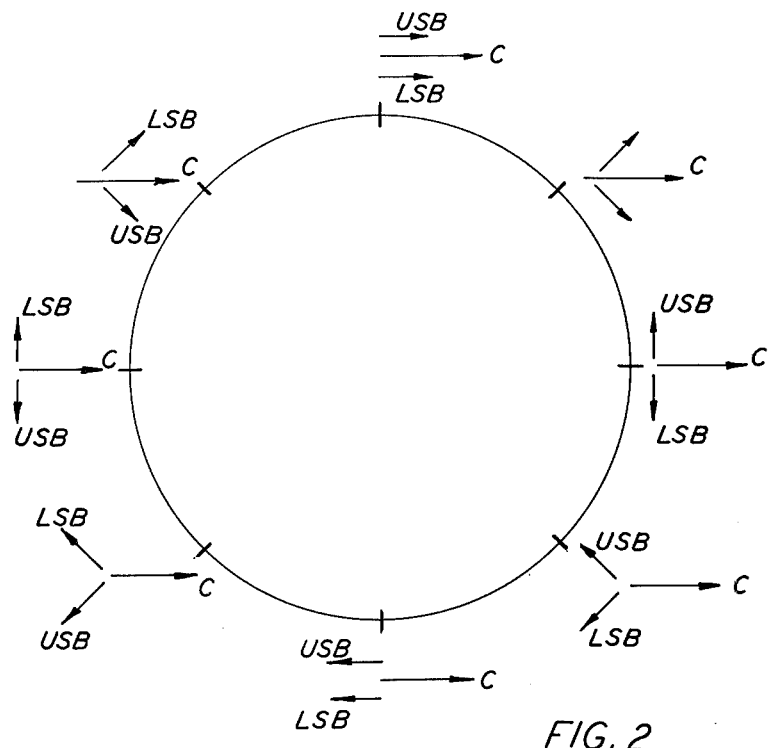
FIG. 2 is a diagram illustrating the far field patterns generated by the antenna system of FIG. 1.

FIG. 2 is a phase diagram of the far field pattern produced by the antenna system of FIG. 1. The far field pattern generated by the sideband is omnidirectional but the r.f. phase thereof is directly related to azimuth. The carrier signal transmitted by carrier antenna 12 has the same r.f. phase in every direction. The r.f. phase of the carrier (C), lower sideband (LSB) and upper sideband (USB) signals is shown versus azimuth on FIG. 2. By virtue of the combination of the carrier, USB, and LSB signals in space, a receiver will perceive an amplitude modulation at the frequency of the offset signal. The phase of this amplitude modulation will vary directly with the bearing angle of the receiver to the station (or azimuth to the station). The receiver will thus be able to provide a measurement of bearing by comparing the phase of the amplitude modulation to the phase of a reference pulse or burst of pulses which is sent omnidirectionally as a direct modulation of the transmitter feeding the power divider 11. As noted above, this direct modulation technique is well known in the art.

DERIVATION OF ANTENNA PATTERN

The following derivation shows that the r.f. phase of the LSB signal varies directly with bearing to the antenna system. The dependence of the r.f. phase of the USB signal on bearing to the antenna system can be inferred from similarity. Assume that the four sidebands are identical and are excited with equal power, so that:

$$I_A = I_0 \sin(\omega t + 0)$$

$$I_B = I_0 \sin(\omega t + \pi/2)$$

$$I_C = I_0 \sin(\omega t + \pi)$$

$$I_D = I_0 \sin(\omega t - \pi/2)$$

Figure 3:
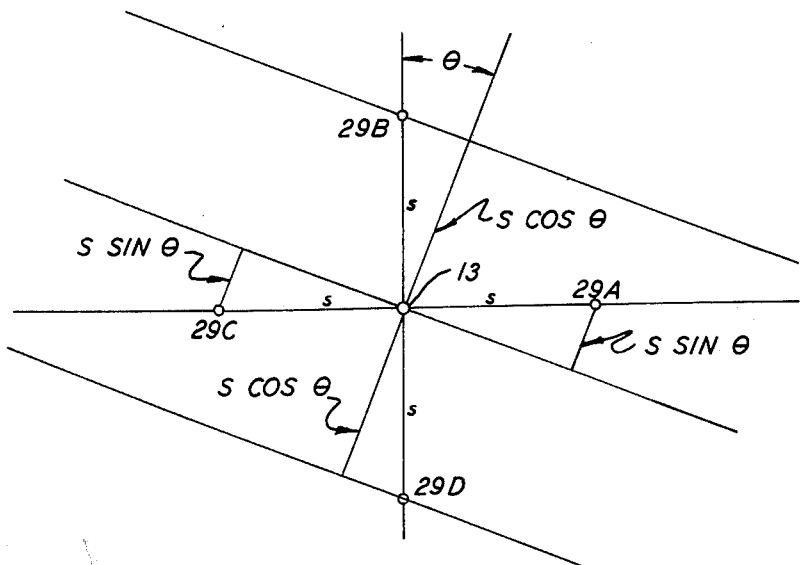
FIG. 3 is a diagram explaining the manner in which the far field pattern is generated.

Referring to FIG. 3, it can be seen that the field produced by the four sideband antennas at a bearing $\theta$ from the antenna system will be:

$$F(\theta) = \sin[\omega t + (2\pi S/\lambda)\sin\theta] + \sin[\omega t + (2\pi S/\lambda)\cos\theta + \pi/2] + \sin[\omega t - (2\pi S/\lambda)\sin\theta + \pi] + \sin[\omega t - (2\pi S/\lambda)\cos\theta - \pi/2] = 2(\cos\omega t \sin[(2\pi S/\lambda)\sin\theta] - \sin\omega t \sin[(2\pi S/\lambda)\cos\theta]) = 2\sin[(2\pi S/\lambda)\cos\theta] + 2j\sin[(2\pi S/\lambda)\sin\theta]$$

or $$\tfrac{1}{2} F(\theta) = [J_1(2\pi S/\lambda)\cos\theta - J_3(2\pi S/\lambda)\cos 3\theta + J_5(2\pi S/\lambda)\cos 5\theta \ldots] + j[J_1(2\pi S/\lambda)\sin\theta + J_3(2\pi S/\lambda)\sin 3\theta + J_5(2\pi S/\lambda)\sin 5\theta \ldots]$$

The phase angle $\phi$ of the field is:

$$\phi = \tan^{-1}([J_1(2\pi S/\lambda)\sin\theta + J_3(2\pi S/\lambda)\sin 3\theta + J_5(2\pi S/\lambda)\sin 5\theta \ldots]/[J_1(2\pi S/\lambda)\cos\theta - J_3(2\pi S/\lambda)\cos 3\theta + J_5(2\pi S/\lambda)\cos 5\theta \ldots])$$

If $(2\pi S/\lambda)$ is chosen to make $J_3$ and higher Bessel functions terms small compared to $J_1$, then:

$$\tfrac{1}{2} F(\theta) \approx -[J_1(2\pi S/\lambda)\cos\theta] + j[J_1(2\pi S/\lambda)\sin\theta]$$

The magnitude of the field is:

$$|F(\theta)| \approx 2J_1(2\pi S/\lambda)$$

Since field magnitude is independent of $\theta$, perecentage phase modulation will be independent of bearing to the station.

The phase angle $\phi$ of the field will be $$\phi \approx \tan^{-1}(-\sin\theta/\cos\theta) = -\theta$$

Thus the phase angle $\phi$ of the field varies directly with bearing $\theta$ to the antenna system.

If the value of $(2\pi S/\lambda)$ is properly chosen, the existence of higher Bessel function terms does not significantly effect the magnitude or phase angle of $F(\theta)$. The higher order Bessel function terms will introduce some variations in the percentage of amplitude modulation as a function of the bearing angle $\theta$. Some difference will also be introduced between the value of the phase angle $\phi$ and the value of the bearing angle $\theta$. For example, if $(2\pi S/\lambda) = 1$, then:

$$J_1(1) = 0.44$$

$$J_3(1) = 0.0196$$

$$J_5(1) = 0.00025$$

Figure 4:
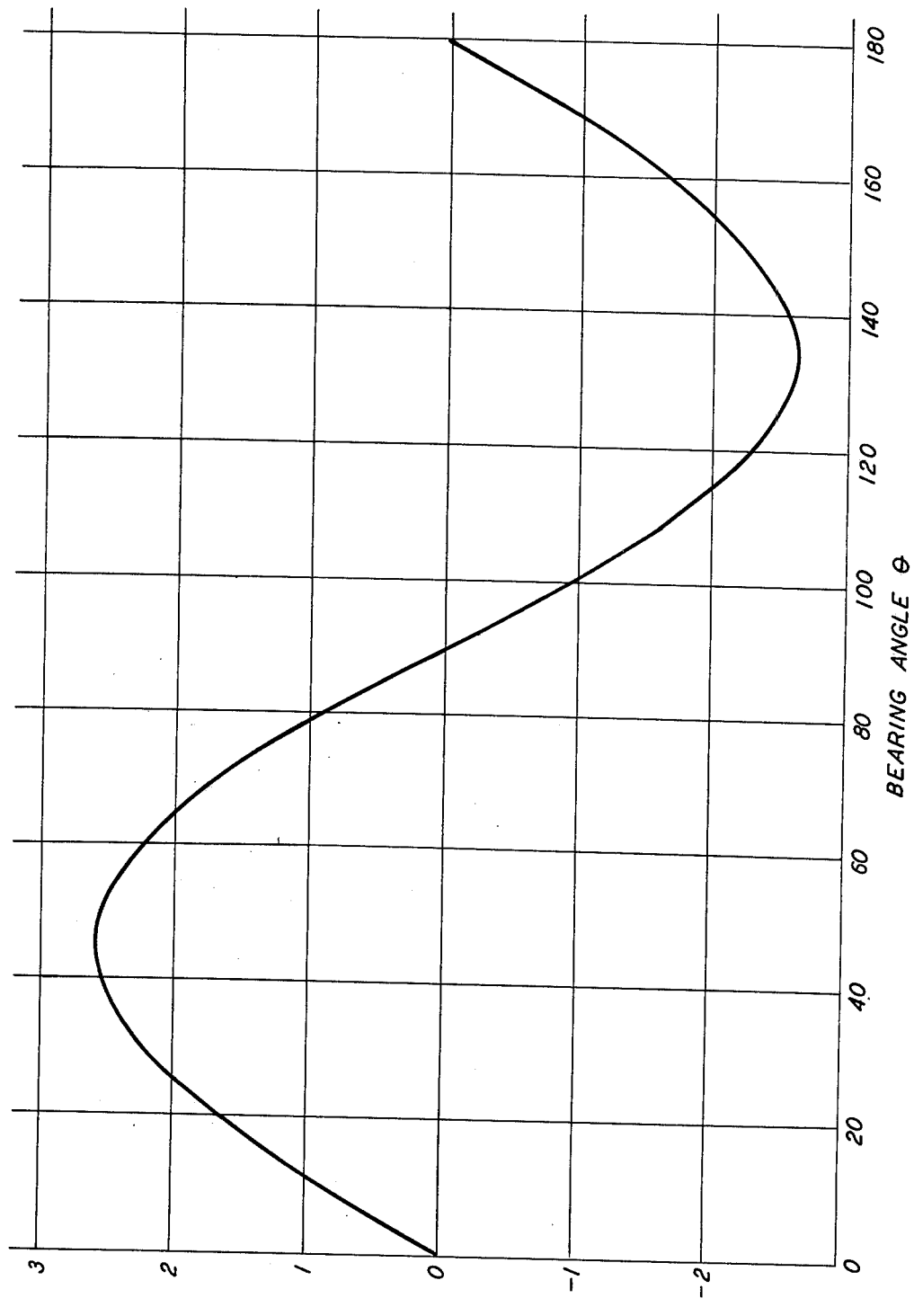
FIG. 4 is a plot over 360° of the difference between the phase angle of the amplitude modulated signal and the bearing angle to the signal source.

As shown in FIG. 4, for these of the Bessel function terms the error in equating phase angle $\phi$ to bearing angle $\theta$ is a maximum of about 2.6°, and occurs at $\theta = \pm 45°$. Thus it can be seen that if the value of $(2\pi S/\lambda)$ is chosen to minimize the value of higher Bessel function terms, the phase angle $\phi$ of the LSB signal will be approximately the same as the bearing angle $\theta$.

What is claimed is:

1. A method for generating an amplitude-modulated signal with a phase varying directly with the bearing angle to the source of the amplitude modulated signal, which comprises:
   (a) generating a carrier signal having a carrier frequency;
   (b) generating an offset signal having an offset frequency;
   (c) modulating the carrier signal to generate an upper sideband (USB) signal having a USB frequency equal to the sum of the carrier frequency and the offset frequency;
   (d) modulating the carrier signal to generate a lower sideband (LSB) frequency equal to the offset frequency subtracted from the carrier frequency said LSB frequency being $\pi$ radians out of phase with said USB frequency;
   (e) successively phase advancing the USB signal to produce first, second and third phase-advanced USB signals advanced in phase $\pi/2$ radians, $\pi$ radians, and $3\pi/2$ radians respectively in relation to the USB signal;
   (f) successively phase delaying the LSB signal to produce first, second and third phase-delayed LSB signals delayed in phase $\pi/2$ radians, $\pi$ radians, and $3\pi/2$ radians respectively in relation to the LSB signal;
   (g) positioning four sideband antennas at the vertices of a square;
   (h) positioning a carrier antenna at the center of the square;
   (i) feeding the carrier signal to the carrier antenna;
   (j) feeding the USB and LSB signals to a first sideband antenna;
   (k) feeding the first phase-advanced USB signal and first phase-delayed LSB signal to a second sideband antenna located adjacent to the first sideband antenna;
   (l) feeding the second phase-advanced USB signal and the second phase-delayed LSB signal to a third sideband antenna located adjacent to the second sideband antenna; and
   (m) feeding the third phase-advanced USB signal and the third phase-delayed LSB signal to a fourth sideband antenna.

2. The method of claim 1 for generating an amplitude-modulated signal with a phase varying directly with the bearing angle to the source of the amplitude-modulated signal, which further comprises:
   feeding a burst of reference pulses to the carrier antenna so that the phase of the reference pulses can be compared to the phase of the amplitude-modulated signal to determine bearing in relation to the source of the amplitude-modulated signal.

3. The method of claim 1 for generating an amplitude-modulated signal with a phase varying directly with the bearing angle to the source of the amplitude-modulated signals, in which said step of modulating the carrier frequency to generate an upper sideband (USB) signal having a USB frequency equal to the sum of the carrier frequency and the offset frequency comprises cyclically repeating at a rate equal to the offset frequency the steps of:
   (a) introducing into the carrier signal a phase advance which varies linearly over time from 0 radians to $2\pi$ radians, and
   (b) resetting the phase advance to 0 radians.

4. An antenna system for using a carrier signal and an offset signal to generate an amplitude-modulated signal directly related to bearing to the antenna system, which comprises:
   (a) a carrier antenna;
   (b) a plurality of sideband antennas, 4 in number, equidistant from the carrier antenna and with an equal angular displacement of $\pi/2$ radians between adjacent sideband antennas;
   (c) means for modulating the carrier signal to generate a first upper sideband (USB) signal having a USB frequency equal to the sum of the carrier frequency and the offset frequency;
   (d) means for modulating the carrier signal to generate a first lower sideband (LSB) signal having a LSB frequency equal to the offset frequency subtracted from the carrier frequency;
   (e) means for successively phase advancing the first USB signal to produce a phase-advanced USB series of three phase-advanced USB signals, with each phase-advanced USB signal advanced in phase $\pi/2$ radians with respect to its predecessor in the phase-advanced USB series;
   (f) means for successively phase delaying the first LSB signal to produce a phase-delayed LSB series of three phase-delayed LSB signals, with each phase-delayed LSB signal delayed in phase $\pi/2$ radians with respect to its predecessor in the phase-delayed LSB series;
   (g) means for feeding the carrier signal to the carrier antenna;
   (h) means for feeding the first USB signal to one of the sideband antennas;
   (i) means for feeding the signals in the phase-advanced USB series to the remaining sideband antennas so that proceeding around the sideband antennas in a chosen direction the phase of the phase-advanced USB signal fed to a sideband antenna is advanced in phase $\pi/2$ radians with respect to the USB signal fed to the preceding sideband antenna;
   (j) means for feeding the first LSB signal to one of the sideband antennas; and
   (k) means for feeding the signals in the phase-delayed LSB series to the remaining sideband antennas so that proceeding around the sideband antennas in said chosen direction the phase of the phase-delayed LSB signal is delayed in phase $\pi/2$ radians with respect to the LSB signal fed to the preceding sideband antenna.

5. The antenna system of claim 4 for using a carrier signal and an offset signal to generate an amplitude-modulated signal directly related to bearing to the antenna system, which further comprises:
   means for feeding a burst of reference pulses to the carrier antenna so that the phase of the reference pulses can be compared to the phase of the amplitude-modulated signal to determine bearing in relation to the antenna system.

6. An antenna system for using a carrier signal and an offset signal to generate an amplitude-modulated signal directly related to bearing to the antenna system, which comprises:
   (a) a carrier antenna;

(b) four sideband antennas equidistant from the carrier antenna and with an equal angular displacement of $\pi/2$ radians between adjacent sideband antennas;

(c) means for modulating the carrier signal to generate an upper sideband (USB) signal having a USB frequency equal to the sum of the carrier frequency and the offset frequency;

(d) means for modulating the carrier signal to generate a lower sideband (LSB) signal having an LSB frequency equal to the offset frequency subtracted from the carrier frequency;

(e) combinative phase modifying means for generating a series of four combined signals having USB and LSB signal components in which the phase of each USB component is advanced $\pi/2$ radians with respect to the USB signal component of the preceding signal in the series and the phase of each LSB signal component is delayed $\pi/2$ radians with respect to the LSB signal component of the preceding signal in the series;

(f) means for feeding the carrier signal to the carrier antenna; and (g) means for feeding the series of four combined signals to the four sideband antennas so that proceeding around the sideband antennas in a chosen direction the signal fed to each sideband antenna has a USB signal component advanced $\pi/2$ radians with respect to the USB signal component fed to the preceding sideband antenna and an LSB signal component delayed $\pi/2$ radians with respect to the LSB signal component fed to the preceding antenna.

7. The antenna system of claim 6, which further comprises:
means for feeding a burst of reference pulses to the carrier antenna so that the phase of the reference pulses can be compared to the phase of the amplitude-modulated signal to determine bearing in relation to the antenna system.

8. The antenna system of claim 7, wherein said means for modulating the carrier signal to generate an upper sideband (USB) signal comprises:
(a) a power divider with the carrier signal as an input;
(b) a modulator driver with the offset signal as an input;
(c) a first serodyne modulator with an input connected to an output of the power divider and which is driven by the output of the modulator driver so that the output of the first serrodyne modulator is a USB signal having a USB frequency equal to the sum of the frequency of the carrier signal and the frequency of the offset signal.

9. The antenna system of claim 8, wherein said means for modulating the carrier signal to generate a lower sideband (LSB) signal comprises:
a second serrodyne modulator with an input connected to an output of the power divider and which is driven by the output of the modulator driver so that the output of the second serrodyne modulator is an LSB signal having an LSB frequency equal to the frequency of the offset signal subtracted from the frequency of the carrier signal.

10. The antenna system of claim 9, wherein the combinative phase modifying means comprises:
(a) signal modification means for:
(i) adding the LSB and USB signals to produce an interim signal;
(ii) inverting the LSB signal, and
(iii) adding the inverted LSB signal and the USB signal to produce a first combined signal
(b) means for delaying the phase of the interim signal by $\pi/2$ radians to produce a second combined signal;
(c) means for inverting the first combined signal to produce a third combined signal; and
(d) menas for inverting the second combined signal to produce a fourth combined signal.

11. The antenna system of claim 10, wherein the signal modification means comprises an r.f. bridge having four equal arms, the first of which is said inverting arm, with an inverting first arm connected between a first node and a second node, a second arm connected between the second node and a third node, a third arm connected between the third node and a fourth node and a fourth arm connected between the first node and the fourth node, having the LSB signal as an input at the first node and the USB signal as an input at the third node, and having the first combined signal as an output at the second node and the second combined signal as an output at the fourth node.

12. The antenna system of claim 6, wherein the frequency of the offset signal is 15 Hertz.

* * * * *